United States Patent Office 3,851,073
Patented Nov. 26, 1974

3,851,073
SWEETENING AGENT
Marvin K. Cook, Westbury, N.Y., assignor to
MacAndrews & Forbes Company, Camden, N.J.
No Drawing. Filed Aug. 3, 1972, Ser. No. 277,657
Int. Cl. A23l 1/26
U.S. Cl. 426—217
4 Claims

ABSTRACT OF THE DISCLOSURE

A sweetening agent comprising ammoniated glycyrrhizin, and an amount of a 5'-nucleotide sufficient to repress the licorice flavor of ammoniated glycyrrhizin.

BACKGROUND OF THE INVENTION

In recent years considerable effort has been devoted to the development of low calorie sweetener in order to eliminate or at least substantially reduce the amount of sugar (sucrose) utilized as a sweetener in foods, beverages and confections. The saccharins, which have a sweetness value of about 500 times that of sucrose, and the cyclamates, which have a sweetness value of about 30 times that of sucrose, have been widely used as a sugar substitute. However, such sweeteners have an objectionable flavor or after-taste. In addition, the U.S. Food and Drug Administration (FDA) has placed restrictions on the use of such synthetic sweeteners, specifically the cyclamates. Recently the FDA has imposed limitations on the use of saccharin as a sugar substitute pending further investigation. In view thereof, considerable interest has recently been given to the use of licorice derivatives as a sugar substitute.

Licorice is a well known material widely used in many fields. The licorice root contains from about 6 to about 14% of glycyrrhizin. This compound is present in the root as the mixed calcium and potassium salt of glycyrrhizic acid.

Glycyrrhizin has a sweetness value about 50 times greater than that of sucrose and is perhaps the sweetest chemical processed commercially that is found in nature. Glycyrrhizic acid is obtained in 90% or more purity (Hausman assay) by grinding the root, extracting the ground material with hot water, and treating the extract to recover the acid insoluble fraction containing the glycyrrhizic acid. Glycyrrhizic acid can be ammoniated, to provide ammoniated glycyrrhizin, by replacing one or more of the three acid hydrogen atoms with ammonium. Ammoniated glycyrrhizin, therefore, includes a mono-ammoniated product, a di-ammoniated product and theoretically includes a tri-ammoniated product although a recent commentator has indicated that the tri-ammoniated salt may not actually be produced. As used in the present specification and appended claims, the term ammoniated glycyrrhizin is meant to include mono-ammoniated, di-ammoniated, and tri-ammoniated glycyrrhizin as well as mixtures thereof. Ammoniated glycyrrhizin is well known and widely used, and also has a sweetness value about 50 times that of sucrose.

Ammoniated glycyrrhizin which is presently the only manufactured sweetener which is on the FDA list of natural flavoring agents generally recognized as safe, has the characteristic licorice flavor and it is primarily for this that this material has found widespread use as flavoring agent in, for example, confections. Because of the licorice flavor this material has not been used alone as sweetening agent except in some licorice-flavored confections, since the amount required for sweetening also imparts the characteristic licorice flavor.

Ammoniated glycyrrhizin has been used to potentiate the sweetness of sucrose in sucrose-containing foods, confections and beverages at levels which do not impart appreciably the licorice flavor as disclosed in U.S. Pat. No. 3,282,706. Nevertheless, obtaining the desired degree of sweetness according to this patent still requires the use of considerable, even though reduced, amounts of sucrose.

The 5'-nucleotides (also referred to as ribonucleotides), e.g. disodium 5'-inosinate, disodium guanylate, and mixtures thereof, are well known food additives, and are primarily used in both natural and synthetic meat preparations as a flavor enhancer and stimulator. It has been reported that 5'-nucleotides have no effect on fruit products, preserves, confections and other high sugar products. It has thus been concluded that sweet products generally do not respond beneficially as regards flavor to the use of 5'-nucleotides.

It is an object of this invention to provide a sweetening composition having a sweetening value many times that of sucrose, yet is free of undesirable after-taste.

Another object of this invention is to provide a sweetening composition based on ammoniated glycyrrhizin, and free of any licorice taste.

These and other objects of this invention will become apparent from this specification and appended claims.

DETAILED DESCRIPTION OF THE INVENTION

According to this invention, there is provided a novel sweetening agent comprising ammoniated glycyrrhizin and a 5'-nucleotide in an amount sufficient to repress the licorice flavor of the ammoniated glycyrrhizin.

As stated previously, ammoniated glycyrrhizin, although it has a sweetness value many times that of sucrose, nevertheless, has a licorice flavor which renders it unsuitable for use as a sweetening agent generally. It was discovered, however, that when ammoniated glycyrrhizin is combined with a small amount of a 5'-nucleotide, the licorice flavor is substantially or completely repressed yet the ammoniated glycyrrhizin retains a sweetness value on the order of 50 times that of sucrose. This result was particularly unexpected since, as noted, 5'-nucleotides have no effect on high sugar products, and are known flavor enhancers. Thus, by reason of this invention there is provided a safe sweetening agent which can be used in place of sucrose and other sugars in various food products such as cakes, pies and confections. Advantageously, the sweetener not only is of the low calorie type, but does not possess any objectionable flavor or aftertaste which typifies most artificial sweeteners.

The 5'-nucleotides which may be used to repress the licorice flavor of ammoniated glycyrrhizin according to this invention include both naturally occurring and synthetic types, provided they are palatable. Thus, useful 5'-nucleotides include 5'-inosinic acid, 5'-guanylic acid and the sodium salts of such acids. Suitable synthetic 5'-nucleotides are disclosed in U.S. Pat. No. 3,408,206. The term "5'-nucleotide" as used in this invention includes any physiologically acceptable and edible nucleotide as well as the edible salts thereof. A preferred 5'-nucleotide comprises a mixture of the disodium salts of 5'-inosinic acid and 5'-guanylic acid.

The amount of 5'-nucleotide combined with the ammoniated glycyrrhizin should be sufficient to repress substantially or completely any licorice flavor. The quantity required to obtain this result will vary to some degree with the particular 5'-nucleotide selected, some being more effective than others. Generally on the order of from about 0.005% to about 3% preferably about 1%, by weight, of the 5-nucleotide, based on the weight of ammoniated glycyrrhizin will be sufficient to repress the licorice flavor. Greater amounts of 5'-nucleotide can be utilized but once the amount used is sufficient to repress the licorice flavor, little is to be gained by using substantially larger amounts.

Since ammoniated glycyrrhizin and 5'-nucleotides are solids, they can be prepared in finely divided form and mixed together to form a powdered product.

As stated above, ammoniated glycyrrhizin is obtained by replacing one, two or all of the three acid hydrogen atoms of glycyrrhizic acid with ammonium ions. Any of the above forms of ammoniated glycyrrhizin may be used in the present invention, although the mono-ammoniated form is preferred.

As will be appreciated, the sweetening agent of this invention may be utilized in a wide variety of food products; in fact, it may be utilized to replace any or all of the sugar or artificial sweetening agent presently used in edible food products. The sweetener will thus find wide utility in the preparation of various foods, beverages, flavors and confections. In addition, the sweetening agent may be utilized in pharmaceutical, dentifrice and cosmetic products.

The ammoniated glycyrrhizin salt-5'-nucleotide sweetening agent may be added to products at levels sufficient to provide the desired sweetening effect. As will be appreciated, the amount of sweetening agent required in a given product depends on a variety of factors including the relative bitterness or tartness of the product, the presence of any undesirable flavors which must be masked, and the level of sweetness generally found acceptable in the product. An acceptable sweetening effect can be achieved with at little as 0.2% or less or as much as 1% or more by weight, based on the weight of the sweetened product of the ammoniated glycyrrhizin salt-5'-nucleotide sweetener.

The following examples illustrate the use of the sweetening agent of this invention as a substitute for sugar and other sweetening agents.

EXAMPLE 1

A chewing gum was prepared in the normal manner by formulating a mixture of 22% chewing gum rubber base, 50% sorbitol solution, 25% mannitol solution, 1.8% calcium carbonate, 1% spearmint oil and 0.2% ammoniated glycyrrhizin-5'-nucleotide sweetener, all percentages being, by weight, based on the weight of the chewing gum formulation. The sweetener contained 1% of the 5'-nucleotide based on the weight of ammoniated glycyrrhizin. The chewing gum was evaluated by a flavor test panel of 20 people and found to be completely free of any licorice nuance and equivalent in sweetness to a gum formulation prepared in the same manner containing 0.1% saccharin in place of the ammoniated glycyrrhizin-5'-nucleotide sweetening agent.

EXAMPLE 2

A sugar-free candy gum drop was prepared by formulating in the usual manner a mixture of 54% gum arabic, 30.7% water, 2% U.S.P. glycerine, 12% sorbitol solution, 0.1% citric acid, 1% distilled spearmint oil, 0.2% ammoniated glycyrrhizin-5'-nucleotide sweetener and certified color additions, all percentages being, by weight, based on the weight of the candy gum drop formulation. The sweetener contained 1% of the 5'-nucleotide based on the weight of ammoniated glycyrrhizin. The gum drop was free of any licorice nuance and equivalent in sweetness to a gum drop prepared in the same manner containing 0.1% saccharin in place of the ammoniated glycyrrhizin-5'-nucleotide sweetening agent.

EXAMPLE 3

A sugar-free dentifrice cream was prepared in the usual manner by formulating a mixture of 50% dicalcium phosphate, dental grade, 30% U.S.P. glycerine, 1% gum tragacanth, 1% sodium lauryl sulfate, 0.05% methyl parahydroxybenzoate, 1% peppermint oil, 16.7% water and 0.2% ammoniated glycyrrhizin-5'-nucleotide sweetener, all percentages being, by weight, based on the dentifrice composition. The sweetener contained 1% of the 5'-nucleotide based on the weight of ammoniated glycyrrhizin. The dentifrice cream was free of any licorice nuance and equivalent in sweetness to a dentifrice cream formulated in the same manner containing 0.1% saccharin in place of the ammoniated glycyrrhizin-5'-nucleotide sweetening agent.

EXAMPLE 4

A sugar-free, low calorie chocolate pudding was prepared by initially forming a mixture of 15.2% Margel® (Kelco Company), 13.3% calcium gluconate U.S.P., 7.9% tetrasodium pyrophosphate (food grade), 0.8 vanillin, 61.5% cocoa (10–12% fat, dutched), 0.4 anhydrous malt and 0.2% ammoniated glycyrrhizin-5'-nucleotide sweetener, all percentages being by weight, based on the weight of the pudding formulation. The sweetener contained 1% of the 5'-nucleotide based on the weight of ammoniated glycyrrhizin. 26 g. of the above mixture was well blended with 16 ounces of cold skim milk until a smooth, lump free pudding formed. The pudding was free of any licorice nuance and equivalent in sweetness to a pudding formulated in the same manner containing 0.1% saccharin in place of the ammoniated glycyrrhizin-5'-nucleotide sweetening agent.

What is claimed is:

1. A sweetening agent comprising ammoniated glycyrrhizin and a 5'-nucleotide in an amount which represses the licorice flavor of the ammoniated glycyrrhizin.
2. The sweetening agent according to claim 1 wherein the 5'-nucleotide is present in an amount of from about 0.005% to about 3% by weight, based on the weight of ammoniated glycyrrhizin.
3. The sweetening agent of claim 2 wherein the 5'-nucleotide is present in an amount of about 1% by weight, based on the weight of ammoniated glycyrrhizin.
4. A food product containing the sweetening agent of claim 1.

References Cited
UNITED STATES PATENTS

| | | | |
|---|---|---|---|
| 3,282,706 | 11/1966 | Muller | 426—213 |
| 3,356,505 | 12/1967 | Morris | 426—175 |

JOSEPH M. GOLIAN, Primary Examiner

U.S. Cl. X.R.

426—175